July 4, 1939.  G. F. HOUSTON  2,164,923
CLUTCH CONTROL MECHANISM
Filed Dec. 6, 1935  2 Sheets-Sheet 1
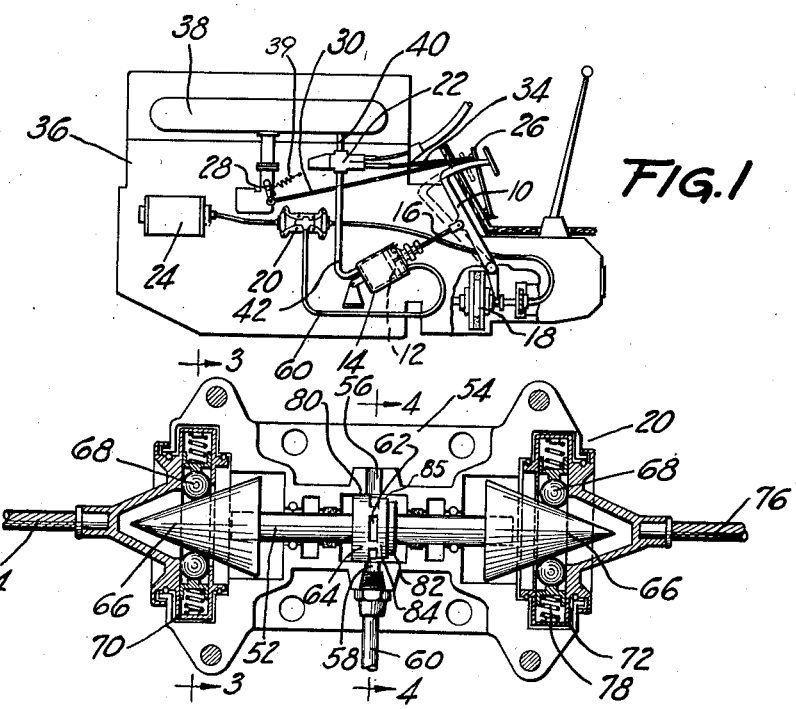
FIG.1
FIG.2
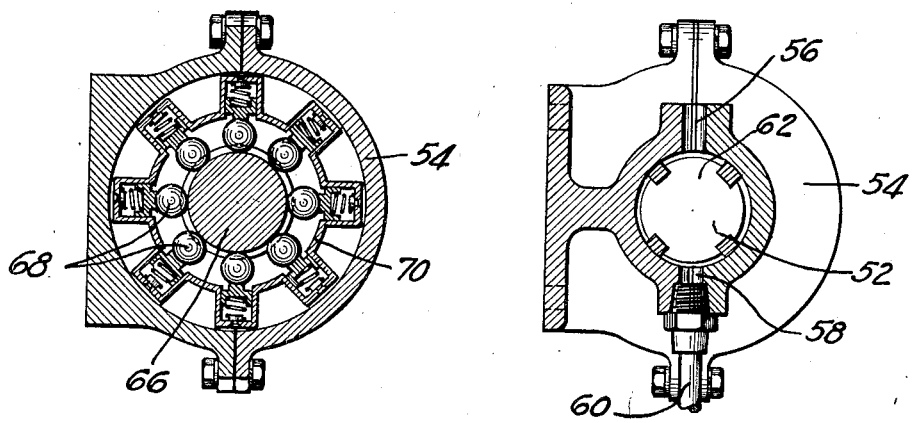
FIG.3  FIG.4
INVENTOR.
GEORGE F. HOUSTON
BY H. O. Clayton
ATTORNEY

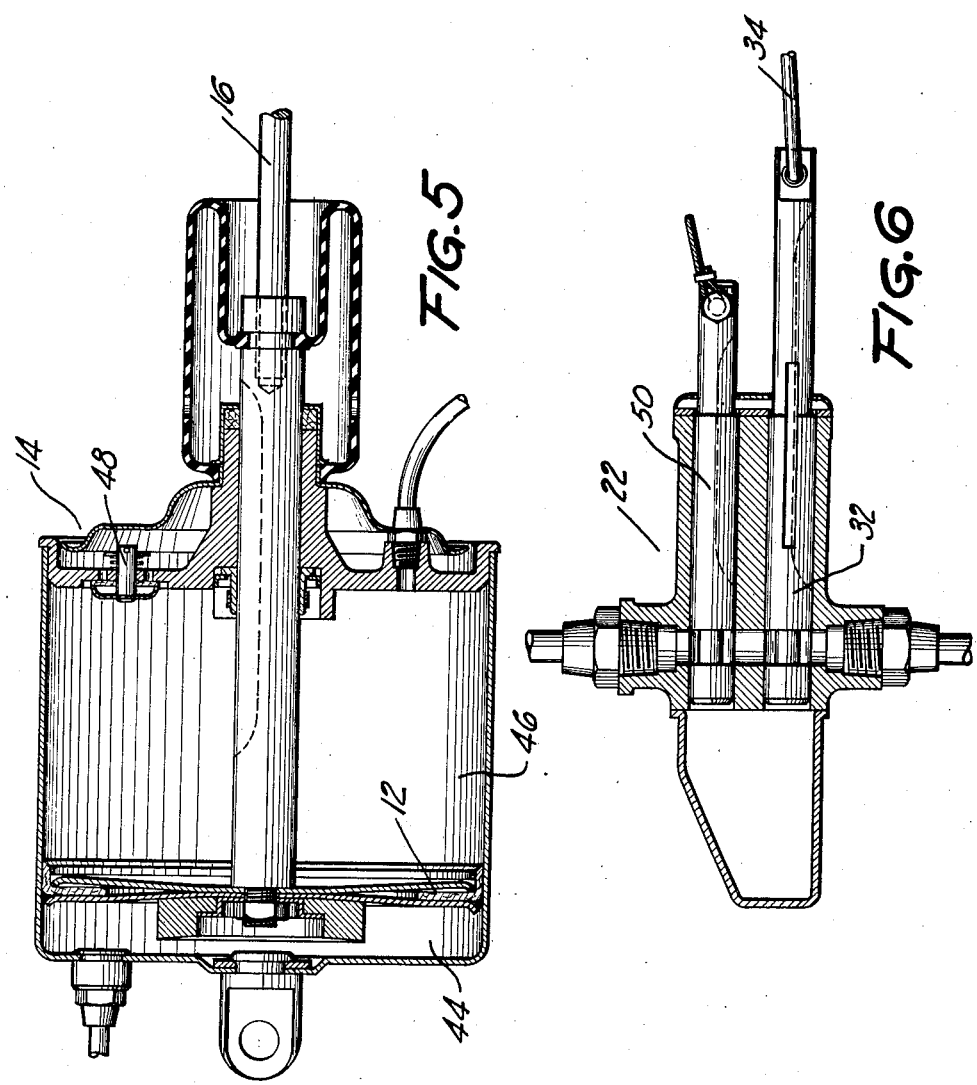

Patented July 4, 1939

2,164,923

UNITED STATES PATENT OFFICE 2,164,923

CLUTCH CONTROL MECHANISM

George F. Houston, Hamilton, Ohio, assignor to Bendix Products Corporation, South Bend, Ind., a corporation of Indiana Application December 6, 1935, Serial No. 53,127

9 Claims. (Cl. 192—.01)

This invention relates in general to governor means for controlling a clutch and in particular to such means for controlling the clutch of an automotive vehicle.

It is the principal object of the invention to provide power means for operating an automotive clutch of the friction type, the clutch engaging operation of said means being controlled by a governor, operable to insure a smooth engagement of the clutch.

Yet another object of the invention is to provide means for controlling the clutch engaging operation of a power clutch mechanism, said means being operative to insure a smooth engagement of the clutch, when the speed of the driven element of the clutch exceeds that of the driving element of the clutch, and being operative to effect a multistage engagement of the clutch when starting the vehicle from rest.

The invention further contemplates the provision of a simple yet effective type of combined governor and bleed valve unit for a power operated clutch controlling mechanism.

A further object of the invention is to provide a bleed valve for a power clutch mechanism operative to insure a smooth engagement of the clutch after a free-wheeling operation of the vehicle.

Other objects of the invention and desirable details of construction and combinations of parts will become apparent from the following description of a preferred embodiment, which description is taken in conjunction with the accompanying drawings, in which:

Figure 1 is a diagrammatic view of the clutch control mechanism constituting my invention;

Figure 2 is an enlarged sectional view of the governor and bleed valve unit of the mechanism of Figure 1, said unit constituting the essence of the invention;

Figures 3 and 4 are sectional views, taken on lines 3—3 and 4—4 of Figure 2, disclosing details of the governor and bleed valve unit;

Figure 5 is a sectional view of the clutch operating motor of the mechanism of Figure 1; and Figure 6 is a sectional view of the combined cut-out and three-way valve unit of the mechanism of Figure 1.

Referring now to Figure 1 for a description of the principal elements of my invention, a clutch pedal 10 is operatively connected to a piston 12 of a pressure differential operated clutch motor 14 by means of a connecting rod 16. The clutch pedal is operably connected to a friction clutch 18 comprising the usual driving and driven elements. The clutch disengaging and engaging operations of the motor are controlled by valve units 20 and 22, described in detail hereinafter, the unit 20 being preferably, though not necessarily, controlled by means such as a generator 24 and by means connected to the driven element of the clutch. Whether directly or indirectly connected to said clutch elements, the valve 20 functions, as described in detail hereinafter, to control the rate of engagement of the clutch in accordance with the difference in speeds of the driving and driven clutch elements.

Describing the operation of the aforementioned mechanism, upon release of an accelerator 26, connected to a throttle 28 by a link 30 and to a three-way valve plunger 32 by link 34, the throttle is closed to idle an internal-combustion engine 36 and thereby create a source of vacuum in an intake manifold 38. The throttle is biased to its off position by a return spring 39. The accelerator release also serves to move the valve plunger 32 to the position disclosed in Figure 6 to interconnect the manifold 38 with the clutch motor 14 via conduits 40 and 42. Such connection results in an evacuation of a compartment 44 of the clutch motor and a disengagement of the clutch, the atmosphere admitted to a compartment 46, via a check valve 48, acting on the piston 12 to move the same to the position disclosed in Figure 5. If desired, a cut-out valve 50 may be provided to render the power clutch mechanism inoperative.

With the vehicle in motion and the clutch disengaged, it is highly desirable to so control the engagement of the clutch as to obviate a jerking of the vehicle. Such an action results when the clutch is engaged quickly before the speed of the driving clutch element is equal to that of the driven clutch element: the car is then said to pick up the load of the engine, resulting in a deceleration of the car which may be of such degree as to be objectionable to the passengers.

The instant invention is in part directed to the provision of means for so engaging the clutch, when the vehicle is in motion, as to obviate this objectionable jerking action.

To this end the rate of clutch engagement is determined by controlling the rate of efflux of air from the compartment 46 of the clutch motor, such control being initiated by first depressing the accelerator 26 to operate the valve 22 to vent the compartment 44 of the clutch motor to atmosphere. Referring to Figures 2, 3 and 4, a floating bleed valve member 52 is reciprocably mounted in a valve casing 54, the latter being provided with ports 56 and 58, the latter port being connected to the compartment 46 of motor 14 via a conduit 60. The ports 56 and 58 are adapted to register completely or partially with slots 62 in a full bodied portion 64 of the valve member 52. Each end of the bleed valve member is cone-shaped as at 66, said portions being spring loaded by ball bearing members 68 housed within races 70 and 72. The races are journaled in the ends of the casing 54 and drivably connected respectively, by means of connections 74 and 76, to the engine driven generator 24 and to means driven by the driven clutch element. If desired, the races may be driven directly by the clutch elements.

Describing now the operation of the aforementioned combined governor and bleed valve unit 20, with the driven clutch element rotating at a substantial speed, for example, after accelerating the vehicle in low gear or after a free-wheeling operation at high vehicle speed, the balls of race 72 are forced outwardly by centrifugal force against the resistance of return springs 78.

Such action permits the bleed valve 52 to move to the right, Figure 2, to cut off the bleed of air via ports 62, under the action of the spring loaded balls of race 70, the rotative speed of the latter at this time being relatively low by virtue of the fact that the engine is idling. The difference in speeds between the clutch elements may, at the time, be such as to move the valve 52 to completely block the bleed line, thus holding the clutch disengaged. In this position of the parts a land 80 on the full bodied valve portion 64 completely covers the port 56. As the engine speed is increased, however, the valve 52 moves to the left, by virtue of the lessening of pressure from the balls of race 70, the degree of registration of the slots 62 with the ports 56 and 58, and accordingly the rate of engagement of the clutch, being a function of the degree of the differential of speeds between the driving and driven clutch elements. The rate of clutch engagement is accordingly progressively increased as the speed of the driving clutch plate increases. When the difference in speeds is high, the engagement of the clutch is slow, as is desired, and when the speed of the clutch elements becomes equal, the slots 62 are in full registration with the ports 56 and 58, and the completion of the engagement of the clutch is very quickly effected. A smooth clutch engagement is thus insured under all driving conditions.

In starting the vehicle from rest, the bleed valve mechanism functions to effect a multistage clutch engagement, a shouldered portion 82 of the valve member 52 registering with the ports 56 and 58, when the driven clutch plate is at rest. The air then passes from the clutch motor 14 relatively rapidly, effecting a relatively rapid clutch engaging movement of the driven clutch plate. When the clutch plates contact, the vehicle begins to move, the driven plate begins to rotate, the shouldered portion 82 moves out of registry with the ports 56 and 58 and a land portion 84 moves into registry therewith. The engagement is thus automatically slowed down. If desired, the land portion 84 may be slightly undercut at 85 to provide a slight bleed connection between the shoulder 82 and the ports 56 and 58.

As the speed of the driven clutch element increases, the slots 62 progressively begin to register with the ports 56 and 58, thus automatically stepping up the rate of clutch engagement.

There is thus provided a fast, then slow, and then relatively fast clutch engagement: however, the size and shape of the ports 56 and 58 and slots 62 and the width of the lands 80 and 84 and shoulder 82 may be varied to effect the desired mode of clutch engagement under all driving conditions. It should also be noted that the rate of bleed of air out of the clutch motor via the shouldered portion 82 determines the rate of loading of the clutch plates, and the resulting acceleration of the vehicle will cause the floating valve 52 to move to the right, Figure 2. This movement to the right cuts down the rate of bleed of air to the clutch motor by bringing the undercut portion 85 into registry with the port 58.

There is thus provided mechanism for controlling the movement of the valve 52 to insure a smooth start of the vehicle; for the shouldered portion 82 is so constructed as to limit the rate of bleed of air from the clutch motor to a factor such that the pressure differential acting on the piston 12 of the clutch motor will limit the clutch plate loading as desired. In other words and more simply expressed, the floating valve 52 provides a means for so controlling the clutch engaging operation of the mechanism as to insure a smooth start of the vehicle. With the clutch controlling mechanism constituting my invention, the vehicle will never be started with a jerk.

While one illustrative embodiment has been described, it is not my intention to limit the scope of the invention to that particular embodiment, or otherwise than by the terms of the appended claims.

I claim:

1. In an automotive vehicle provided with an internal-combustion engine, an accelerator, and a clutch comprising driving and driven members, power means for operating the clutch comprising a pressure differential operated motor operably connected to the clutch, and further comprising control valve means for said motor including an accelerator operated valve operable to initiate the clutch disengaging and engaging operations of said motor, and governor means for controlling the clutch engaging operation of said motor, said means comprising a member indirectly driven by said engine and a member directly driven by the driven clutch element, said driven members including a plurality of ball bearing race members.

2. In an automotive vehicle provided with a clutch having driving and driven elements, power means for operating the clutch comprising a combined governor and bleed valve unit, said unit including means, operable in accordance with the difference in speeds of said clutch elements, when the speed of the driven clutch element exceeds that of the driving element, for controlling the clutch engaging operation of said power means, said means comprising a floating bleed valve member having cone-shaped ends.

3. In an automotive vehicle provided with a clutch having driving and driven elements and an engine driven generator, power means for operating the clutch, said means including a floating bleed valve member, and further including governor means for actuating said bleed valve member, said governor means including a ball bearing race member housing a plurality of ball bearings, said race being drivably secured to the driven clutch element, and further including another such race member drivably secured to the generator.

4. In an automotive vehicle provided with a clutch having driving and driven elements and an engine driven generator, power means for operating the clutch, said means including a floating bleed valve member, and further including governor means for actuating said bleed valve member, said governor means including a ball bearing race member housing a plurality of ball bearings, said race being drivably secured to the driven clutch element, and another such race member drivably secured to the generator, said bleed valve member including cone-shaped end members in sliding contact with the ball bearings of the aforementioned race units.

5. In an automotive vehicle provided with an internal-combustion engine, an accelerator, and a clutch comprising driving and driven members, power means for operating the clutch comprising a pressure differential operated motor operably connected to the clutch, and further comprising control valve means for said motor including an accelerator operated valve operable to initiate the clutch disengaging and engaging operations of said motor and bleed valve means for controlling the clutch engaging operation of the motor, and governor means for controlling the operation of said bleed valve means, said governor means comprising a member indirectly driven by said engine and a member directly driven by the driven clutch element.

6. In an automotive vehicle provided with an internal-combustion engine, an accelerator, and a clutch comprising driving and driven members, power means for operating the clutch comprising a pressure differential operated motor operably connected to the clutch, and further comprising control valve means for said motor including an accelerator operated three-way valve operable to initiate the clutch disengaging and engaging operations of said motor, a bleed valve, and governor means for operating said bleed valve and thereby controlling the clutch engaging operation of said motor, said means comprising a member indirectly driven by said engine and a member directly driven by the driven clutch element, said members being operable to actuate said bleed valve.

7. In an automotive vehicle provided with a clutch having driving and driven members, power means for operating the clutch comprising a combined governor and bleed valve unit, said unit including means, operable in accordance with the difference in speeds of said clutch members, when the speed of the driven clutch member exceeds that of the driving member, for controlling the clutch engaging operation of said power means, said means comprising a valve casing having bleed ports, and further comprising a floating valve plunger provided with recesses adapted to register with said ports to effect said bleed function.

8. In an automotive vehicle provided with a clutch having driving and driven elements, power means for operating the clutch including a bleed valve for controlling the clutch engaging operation of said power means, and means for operating said bleed valve comprising means operative in accordance with the difference in speeds of said in accordance with the difference in speeds of said clutch elements, when the speed of the driven clutch element exceeds the speed of the driving clutch element, and further operative in a different manner to operate the bleed valve, when the speed of the driven clutch element equals or exceeds the speed of the driving clutch element.

9. In an automotive vehicle provided with a clutch having driving and driven elements, power means for operating the clutch, and means for controlling the clutch engaging operation of said power means including means, operative in accordance with the difference in speeds between the clutch elements, for controlling the rate of engagement of the clutch, said means being operative to effect a multistage engagement of the clutch, when the speed of the driving clutch element exceeds that of the driven clutch element.

GEORGE F. HOUSTON.